Feb. 7, 1967     L. C. KUN     3,302,865
GAS-BEARING ASSEMBLY

Filed July 16, 1964     3 Sheets-Sheet 1

INVENTOR.
LESLIE C. KUN
BY John C. LeDoux
ATTORNEY

INVENTOR.
LESLIE C. KUN
BY John C. LeFever
ATTORNEY

INVENTOR.
LESLIE C. KUN
BY John C. LeDeuer
ATTORNEY

United States Patent Office 3,302,865
Patented Feb. 7, 1967

3,302,865
GAS-BEARING ASSEMBLY
Leslie C. Kun, Williamsville, N.Y., assignor to Union
Carbide Corporation, a corporation of New York
Filed July 16, 1964, Ser. No. 383,006
16 Claims. (Cl. 230—116)

This invention relates to gas-lubricated or gas-bearing supported assemblies for rotating members.

It has long been recognized that gas-lubricated bearing systems potentially offer important advantages over liquid-lubricated rotating systems. For example, the latter are limited to relatively low rotational speeds; high speeds cause overheating and failure of the bearing. Liquid systems often present a problem of containmination of the process fluid with lubricant, as for example in food processing machinery. Also, the lubricant itself may become contaminated, such as with radioactive gases in nuclear equipment. Another limitation of liquid-lubricating systems is possible freezeup in low temperature service, e.g. expansion turbines, or chemical decomposition at high temperatures. All of these disadvantages are avoidable in gas-lubricated bearing support systems.

Unfortunately, previously employed gas-bearing systems are plagued with several types of instability phenomen which tend to prevent high speed operation, even if excessive lubricating gas consumption is allowed to provide a stiffer lubricating film.

Two kinds of gas-bearing instabilities are the most troublesome, synchronous whirl and half-frequency or self-excited whirl. The synchronous whirl is due to mechanical unbalance. If the geometric and gravity axes of the rotating member do not coincide, whirling of the geometric axis can be observed as the rotors, especially at higher speeds, tend to rotate about their inertial (gravity) axis. Because the running clearance of a gas-lubricated bearing system is very small (on the order of 0.5–1 mil), the deviation between the two axes must be kept at a very low value. This may not be a particularly serious problem where a simple cylindrical one-piece shaft is supported on two journal bearings, because dynamic or even static balancing is usually sufficient to produce suitably small imbalance. However, most turbo-machinery rotors are quite complex and may consist of numerous pieces. For example, the shaft bearing-impeller system of one commercially used air expansion turbine consists of more than a dozen pieces. Even if the rotor is balanced initially, during operation the various parts may shift their relative position as experimental evidence has proved.

Other causes of synchronous whirl in prior art gas-lubricated bearing support systems include uneven strains on nonisotropic materials, uneven creep rate of highly stressed rotors, uneven erosion of rotor parts by entrained solids in the working fluid, dimensional instability due to aging, and the presence of thermal gradients in the rotor. These effects may combine and cause severe unbalance. To demonstrate the centrifugal forces due to a possible unbalance, a gas-bearing system having a rotor weight of 80 pounds, a shaft speed of 36,000 r.p.m., and an eccentricity of 0.0005-inch will develop an unbalance force of over 1,400 pounds. Obviously, the gas film would not be able to carry this greatly increased load. Seizure between the shaft and journal would occur.

The other common form of gas-bearing instability, namely half-frequency or self-excited whirl, is induced by the relative velocity between the shaft and bushing or sleeve, and is sustained by the gas film forces therebetween.

The threshold of the circular frequency of the whirl is usually calculated as:

$$\omega = R\sqrt{\frac{k}{m}}$$

where:
$\omega$ = whirl threshold
$R$ = whirl ratio. The usual value is 2 or greater. It is considered to be constant for a given gas bearing and rotational speed, but is a function of the system geometry and other factors.
$k$ = spring constant of the lubricating gas film.
$m$ = mass of the rotor.

The half-frequency whirl is very vexing as it usually occurs below the desired operating speed, and the orbiting amplitude increases very suddenly without warning. Limited evidence also suggests that near the critical frequency or self-excited whirl threshold, the gas-lubricated bearing is extremely sensitive to external excitations. In one experiment a slight tap on the bench where the equipment was located was enough to throw the bearing out-of-balance and cause immediate seizure of the bearing surfaces.

To avoid these aforementioned difficulties, various remedies have been proposed and tested by the prior art. These include increasing the whirl ratio by breaking up the symmetry of the gas film, as for example with longitudinal grooves, noncircular holes and separate thrust pads. Another approach has been to increase the gas film stiffness by preloading, increasing the shaft diameter, optimizing the radial clearance, and increasing the gas supply pressure. A further method is the use or resonant cavities.

All of these possible remedies have drawbacks. For example, longitudinal grooves tend to decrease the gas film stiffness and most of the other methods increase the lubricating gas consumption to an uneconomically high level. Furthermore, they do not solve the aforementioned instability problems due to synchronous whirl.

It is an object of this invention to provide an improved gas-lubricated bearing assembly which avoids mechanical instabilities of the rotating members.

Another object is to provide an improved gas lubricated bearing system which eliminates contact between the shaft and rotor due to synchronous whirl and to self-excited or half-frequency whirl in the desired operating range.

A further object is to provide an improved gas-lubricated bearing system with stability at high rotating speeds and yet relatively low consumption of lubricating gas.

A still further object of the invention is to provide a gas-bearing support assembly where the radial and thrust bearing are integrated such that if the rotor is deflected, all three elements, i.e., rotor, shaft and thrust bearing, move substantially together because of the elastic suspension system. Such an arrangement would eliminate a complicated gimbal joint or pivoted support of the thrust bearing and/or difficult alignment procedures.

Other objects and advantages will be apparent from the ensuing description, the appended claims and the drawings in which:

According to one embodiment, a rotor is provided having a passage therethrough substantially concentrically aligned with the axis of rotation. Means are provided for imparting speed of at least 2000 r.p.m. to the rotor. A rigid primary support member for the rotor extends longitudinally through the passage and is sized to provide a narrow annular space between the outer surface of the primary support member and the passage wall. Means are also provided for introducing sufficient gas into the annular space to support and radially position the rotor. Elastic support means for this primary support member are employed, and a rigid member serves as a secondary support for this flexible elastic support and damping means. If necessary the elastic support means may possess a controllable degree of inherent damping. In one embodiment, elastic support and separate damping means are employed. Means are also provided for receiving at least part of the energy of rotation from said rotor.

Figure 1:
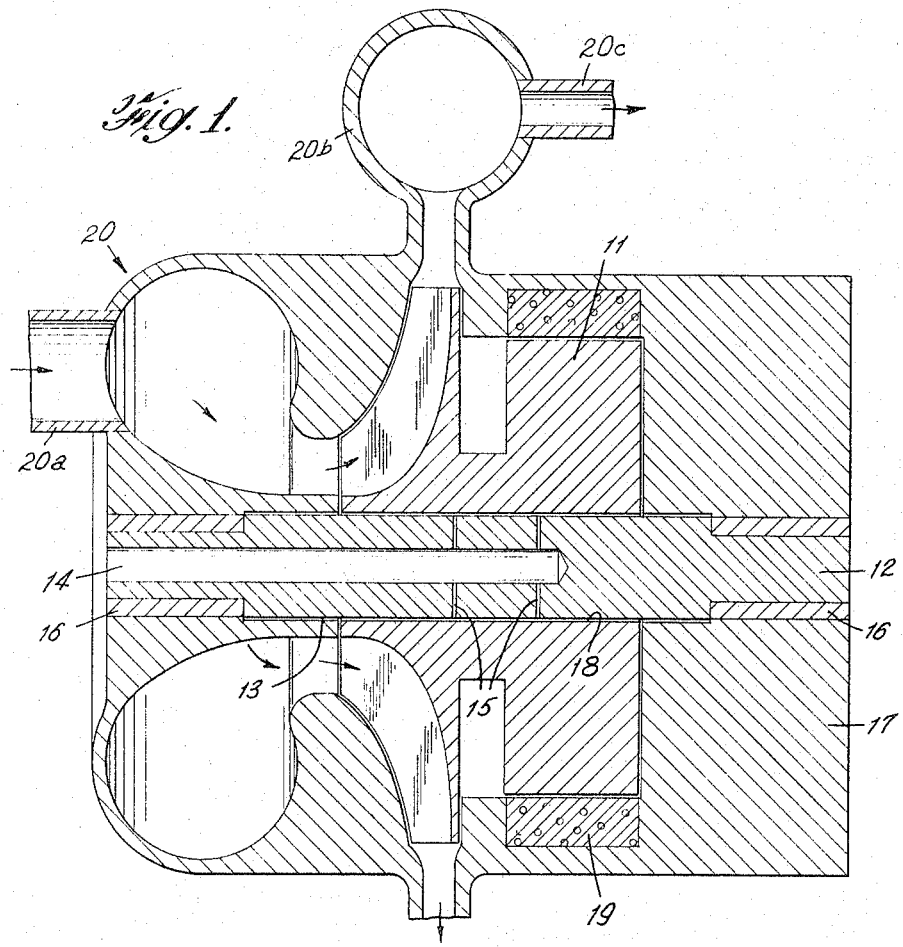
FIG. 1 is an elevation view, taken in cross-section, of a gas-lubricated bearing assembly constructed in accordance with this invention.

Referring now to the drawings and in particular FIG. 1, rotor 11 is supported from non-rotating shaft 12 by a gas film in narrow annular space 13 therebetween, the diametral clearance between the rotor and the shaft being, for example, 0.001 inch. Boring 14 extends longitudinally and preferably concentrically through shaft 12 and communicates with annular space 13 through radial passageways 15. Non-rotating shaft 12 as the rigid primary support member is supported by elastic support and damping means 16, as for example cylindrical inserts formed of elastomers having satisfactory relaxation characteristics such as silicone elastomer or plastics such as polyethylene or polyvinylchloride. Other suitable elastic support and damping means 16 include metal springs of the leaf, Belleville washer and helical types, and mats of metallic or nonmetallic fibers wrapped in layers around an end portion of the non-rotating shaft 12. The metal selected for construction of the elastic support and damping means should be compatible with the intended operating conditions, and preferably possesses a relatively high modulus of elasticity and no measureable creep. Suitable metals include stainless steel, aluminum alloys, titanium and copper bearing alloys such as beryllium-copper. Still another alternative elastic support and damping means is a magnetic suspension assembly employing oppositely positioned magnets and electrical control circuits to maintain central alignment. A further alternative elastic support means is a reduced diameter end portion of the non-rotating shaft. Shaft 12 is supported by rigid secondary member 17. If necessary or desirable, suitable thrust bearing means for axially positioning rotor 11 may be employed.

The advantages of this novel construction were demonstrated in a series of experiments with an assembly constructed in accordance with FIG. 1 and having the following characteristics:

Shaft diameter _____ in__ 0.750
Bearing length _____ in__ 2.25
Lubricating gas and pressure:
    Nitrogen _____ p.s.i.g__ 100
    Ambient pressure _____ atm__ 1
Weight of rotor _____ lb__ 2.79

Nitrogen gas was introduced through boring 14 and communciating passageways 15 to annular space 13 between the outer surface of non-rotating shaft 12 and the wall of radially aligned passageway 18 in rotor 11. A lubricating gas pressure of 40 p.s.i.g. nitrogen was required to lift rotor 11 off the shaft primary support member 12 having four passageways 15 of about 0.020 inch diameter. Rotor 11 was driven by pressurized air discharged through orifices or nozzles and part of its momentum exchanged with a grooved portion of the rotor periphery. The rotor was intentially unbalanced to determine whether this gas-bearing system was useful in improving or eliminating rotor speed restrictions caused by synchronous whirl. It was found that the rotor could be rotated up to 25,000 r.p.m. without contact or seizure between the shaft and rotor. During the experiments, orbiting of the shaft within the rotor was visually observed by stroboscope, as was expected. The rotor was operating about its free or gravity axis instead of about its geometric axis.

Since contact between rotor 11 and shaft 12 did not occur, still higher rotational velocities would have been possible. The flexible support means (i.e. cylindrical elastomer inserts) were replaced by rigid support means, and it was found that a maximum rotational speed of only 11,000 r.p.m. could be reached before rotor contact with the shaft occurred. Thus, use of the flexible elastic support for the non-rotating shaft permitted operation at far higher speeds without rotor contact than were possible for the same configuration but without using the flexible elastic mounting means. The half-frequency whirl speed for rigidly mounted shafts is determined by the well known relationship $$\omega = R\sqrt{\frac{k}{m}}$$

as previously discussed.

Figure 4:
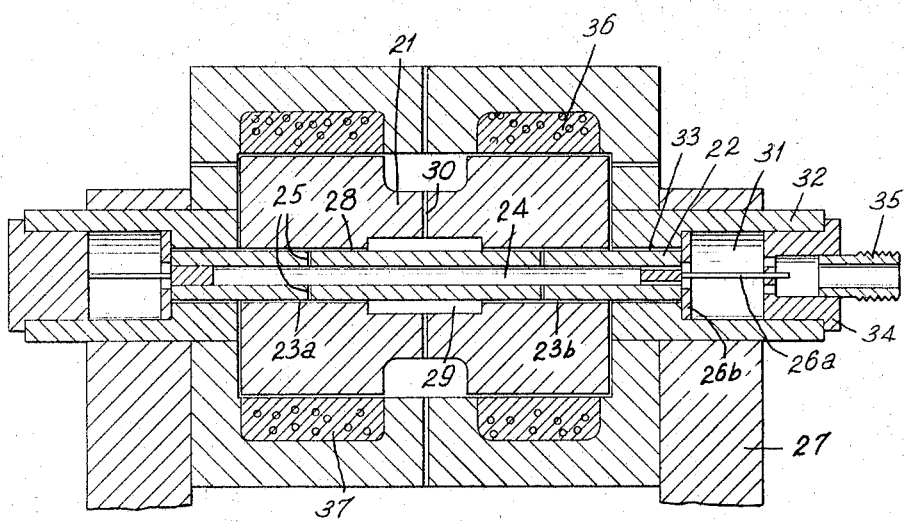
FIG. 4 is an elevation view, taken in cross-section of an assembly similar to FIG. 1 but including multiple gas-lubricating spaces and separate damping means.

The ability of the present gas-bearing system to increase or eliminate the threshold of the self-excited whirl was determined by experiment using apparatus similar to that illustrated in FIG. 4 and having the following characteristics:

Shaft diameter _____ in__ 0.3
Bearing length (portions each ¾ in. long) _____ 2
Lubricating gas and pressure:
    Nitrogen _____ p.s.i.g__ 70
    Ambient pressure _____ atm__ 1
Weight of rotor _____ lb__ 0.29

The maximum speed reached with the shaft rigidly suspended was 17,000 r.p.m. After applying elastic shaft suspension means, the bearing system was successfully operated at speed up to 50,000 r.p.m. using the FIG. 4 construction.

In FIG. 1, electrical energy is received by motor 19 and imparts a speed of at least 2000 r.p.m. to rotor 11. At least part of this energy is transferred from rotor 11 to gas entering compressor 20 through suction casing 20a and leaving through discharge casing 20b. In this embodiment, the rotor contains means for receiving the rotational energy, i.e. discharge passageway 20c of compressor 20. The compressor 20 could be in the form of a gas blower or a liquid pump, either of which may, for example, act to dissipate shaft power as a fluid brake.

Alternatively, rotor 11 may receive energy from a fluid such as the high pressure discharge of a gas compressor. This energy may be transferred through the rotor operating as a turbine and delivered as electrical energy to a generator. This construction is essentially opposite that illustrated in FIG. 1. As used herein, the term "generator" includes equipment used either for producing useful electrical power or for dissipating the energy by electric means such as eddy current brakes.

The relationship between the various parameters have also been studied. Work on the theoretical aspects of this invention had started before these experiments, and subsequently through these tests the results have become known to have important practical significance. Minimum gas film thickness and resonant speeds were obtained as a function of shaft speed and other system parameters. It was discovered that by a suitable selection of the mass ratio of a rotor and primary support member, a lubricating film stiffness and elastic support spring constant ratio may be selected so that the critical or resonant frequencies of the system may be located or "tuned" away from the desired operating speed range. It was further determined that the elastic support means may have a relatively high stiffness, on the order of that employed for the lubricating gas film. For this reason, it is not difficult to keep the rotor concentrically centered with respect to the surrounding components, e.g. shaft seals, field exciting coils, housing and the like.

Figure 2:
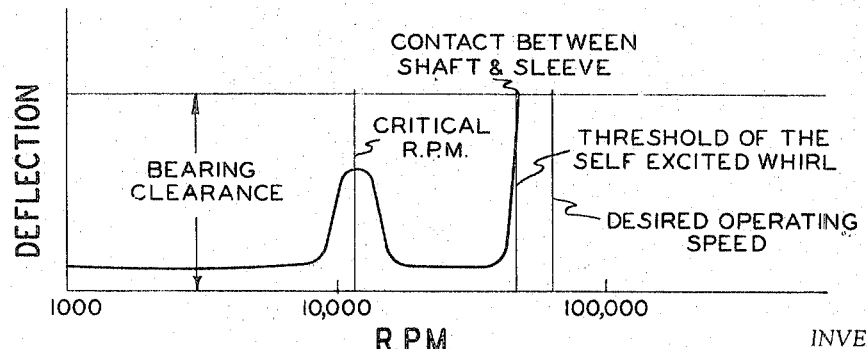
FIGS. 2 and 3 are diagrams illustrating the improved performance afforded by using this invention.
Figure 3:
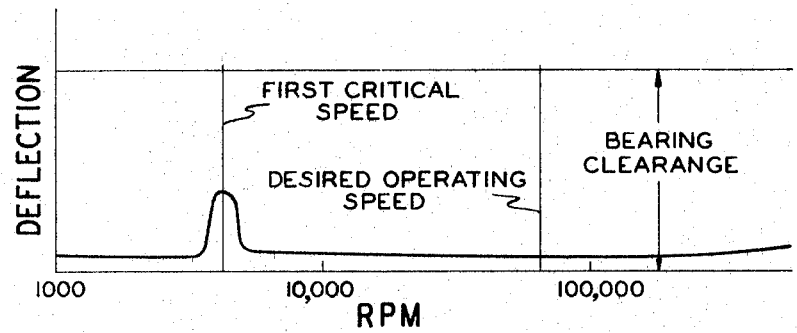

FIG. 2 is a diagram showing the maximum allowable radial deviation of the rotor from equilibrium position versus rotational speed for a conventional rigid non-rotating shaft suspension. The first critical speed occurs at about 10,000 r.p.m., with the threshold of self-excited whirl occurring at a speed less than the desired operating speed. FIG. 3 shows the same relationships as FIG. 2 for the same gas bearing, but with the novel flexible bearing suspension system being employed. By using this invention, the threshold of self-excited whirl is increased to a speed appreciably above that obtainable for the fixed shaft support, and also safely above the desired operating speed of the unit.

It was also determined that if such "tuning away" of resonant frequencies could not be successfully accomplished by a suitable choice of design parameters, particularly for rotors having substantial imbalance, the resulting vibration amplitudes could be kept small (i.e. less than bearing clearance) by employing separate energy dissipation or damping means in addition to the elastic support means. It was found that separating the flexible elastic support and the damping means allows the optimization of both factors independently.

FIG. 4 illustrates a gas-lubricated bearing system similar to the FIG. 1 construction which was also successfully tested. Rotor 21 is supported from non-rotating shaft 22 by gas films in separate, longitudinally displaced narrow annular spaces 23a and 23b. This embodiment is particularly useful where a relatively long rotor is employed. The innermost ends of these narrow spaces 23a and 23b join with lubricating gas space 29 recessed, for example, in either side of the transverse axis of axially aligned rotor passageway 28. The lubricating gas flowing into manifold cavity 29 is vented transversely through discharge passageways 30 in rotor 21 to the atmosphere, or recovered for further use.

In FIG. 4, separate means are provided to elastically support the rigid primary support shaft member 22, and dampen vibrations of this member. Accordingly, flexible elastic support means as for example suspension wire 26a is secured at one end to an end of shaft 22 by metal-bonding. The opposite end of suspension wire 26a is in close-sliding relationship to rigid secondary support member 27. Damping means, for example in the form of elastomer washer 26b is positioned in concentric relationship to suspension wire 26a and contiguous to one end of shaft 22. Washer 26b is also aligned and retained against the inner end of large cavity 31 in thrust bearing 32 which in turn is axially and longitudinally aligned with fixed shaft 22. The large cavity inner end communicates with small cavity 33 of thrust bearing 32, also axially aligned with shaft 22 and extending longitudinally to the opposite end of the bearing adjacent rotor 21. Annular spaces 23a and 23b are sized to be of slightly larger diameter than shaft 22 and the one end of the latter extends longitudinally into the cavity where it is stopped by the damping means 26b.

The open end of large cavity 31 is closed by cap 34 in gas-tight relationship by, for example, threaded engagement. Cap 34 in turn has a central passageway with the outer end threadably engaged to lubricating-support gas supply means connector 35.

In operation, pressurized gas in introduced to connector 35 and consecutively flows through cap 34, thrust bearing large cavity 31, washer 26b central portion, and shaft boring 24 to multiple passageways 25 joining with annular spaces 23a and 23b. Passageways 25 are preferably located substantially equal distances from the transverse axis of rotor 21 for substantially uniform distribution of lubricating gas in annular spaces 23a and 23b. Multiple annular spaces for the support gas serve to increase the gas film stiffness. The movement of rotor 21 at relatively high velocities tends to create movements in elastically supported and non-rotating shaft 22; these movements may produce damaging contact between the rotor and shaft. Elastic seal washer 26b bears contiguously against one end of shaft 22 and dampens its movements, i.e. provides resistance to deformation by instant applied force. At the same time, shaft 22 is elastically supported by flexible wire 26a secured to each end of the shaft. By employing separate elastic support means and damping means, the characteristics of each may be optimized. The FIG. 4 embodiment has been successfully operated at speeds up to 50,000 r.p.m., as previously mentioned.

In FIG. 4, external energy may be received by an electric motor having field coils 36 and imparted to rotor 21. At least part of the resulting rotational energy is transferred from rotor 21 to an electric generator having field coils 37 as the energy receiving means. Thus, the FIG. 4 embodiment is an electric motor-driven generator.

Figure 5:
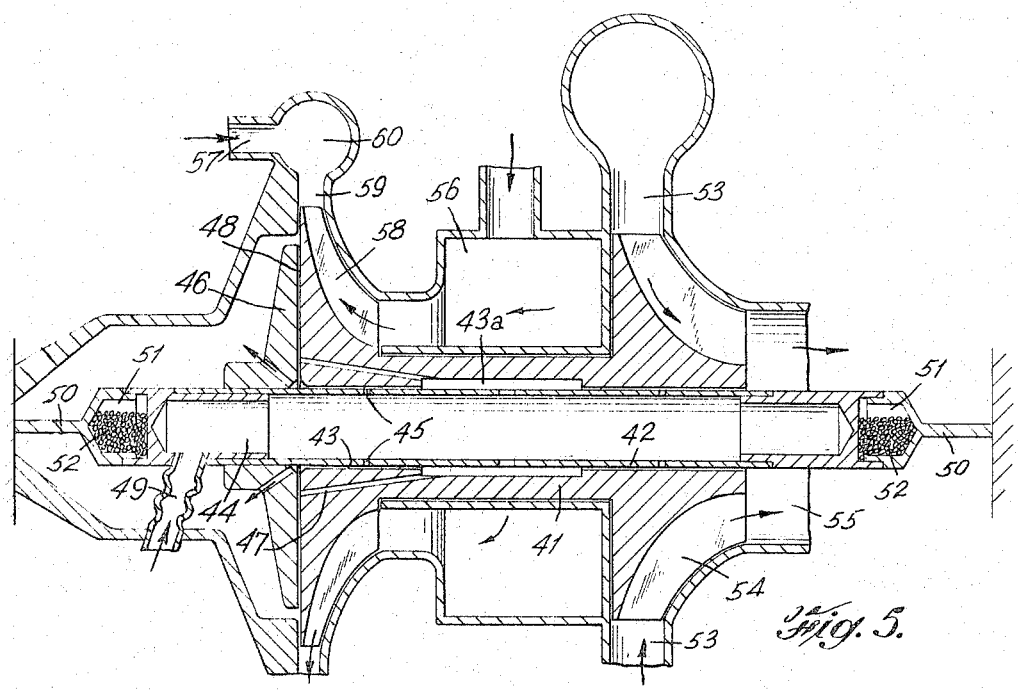
FIG. 5 illustrates still another embodiment of the instant gas-lubricated bearing assembly with metal shot damping means.

FIG. 5 illustrates another gas-bearing support assembly employing separate damping means, which was constructed and successfully tested. Rotor 41 is supported from non-rotating shaft 42 by a gas film located in narrow annular spaces 43 therebetween, the diametral clearance between the rotor and shaft being about .001 inch. Passageway 44 extends longitudinally through shaft 42, and communicates with annular spaces 43 through radial holes 45. Thrust bearing 46 is provided at one end of non-rotating shaft 42 to resist axial forces, and passageway 47 communicates between rotor-shaft annular space 43a and thrust bearing radial space 48. Lubricating gas at super-ambient pressure is supplied through connection 49 to passageway 44, and thence to radial spaces 43 and 48 for support and lubrication.

Non-rotating shaft 42 as the rigid primary support member is supported by elastic support means 50, such as metal rod or tube of reduced diameter. Such rods are the preferred elastic support means of this invention, and may form part of the primary support member with its rigidity reduced by employing a different construction material, or cross-sectional modulus, or by elongation, or a combination thereof.

Apparatus similar to the FIG. 5 construction was operated and the system parameters were carefully measured by suitable means (e.g. damping coefficient of the gas film by displaying the amplitude decay curve of the vibrating rotor on an oscilloscope), and used as input data for a computer program. Excellent agreement between the analytical experimental results were found. This bearing support apparatus also exceeded the threshold of the self-excited whirl for the comparable fixed support construction by a factor of more than two, as indicated by FIG. 3.

To damp vibrations, various types of dashpots may be used and are usually fastened to one end to the rigid secondary support member, e.g. external frame, and on the other end to the rigid primary support member which is usually vibrating. This type of construction may be used with viscous dampers (where the energy is dissipated within a viscous fluid) or with hysteresis type dampers (where the energy is dissipated by intense friction within, e.g. elastomer, foamed elastomer, or plastic members). In some assemblies, however, it is very difficult to provide the vibrating member with a dashpot of a type which must be fastened to the vibrating member on one end and to the rigid frame on the other. Also, in extreme environmental surrounding i.e. very low or very high temperature levels, it is very difficult or even impossible to satisfactorily employ temperature sensitive materials such as viscous fluids, elastomers, plastics, etc. for dashpot purposes.

The dashpot used with this gas bearing system preferably consists of cavities 51 at one or both ends of shaft 42, and partially filled with metal particles of high density and low yield strength, e.g. lead shots. For such devices, the kinetic energy is converted to heat with friction and non-elastic or partially-elastic collisions. Other types of dashpots may also be employed, e.g. the resilient support member may have overlaying telescoping layers, in which case the dissipating mechanism would be the so-called Coulomb friction. Also, the support member may be produced from a material having high internal friction for hysteresis. The latter can be applied, e.g. as a coating outside, or could be located in a hollow elastic support member.

In FIG. 5, external energy is supplied in the form of relatively high pressure gas introduced through nozzle 53 to contact turbine wheel portion 54 of rotor 41 and exhaust at lower pressure through passageway 55. This energy is transferred to rotor 41 which in turn transfers at least part of same to gas in the suction portion 56 of a compressor 57. The pressurized gas flows through rotating passageways 58 and diffuser 59 to the discharge casing 60. From this description, it can be seen that FIG. 5 represents a gas turbine-driven compressor unit. Labyrinth seals and casings around the turbine and compressor wheel portions have not been illustrated for reasons of simplicity.

Figure 6:
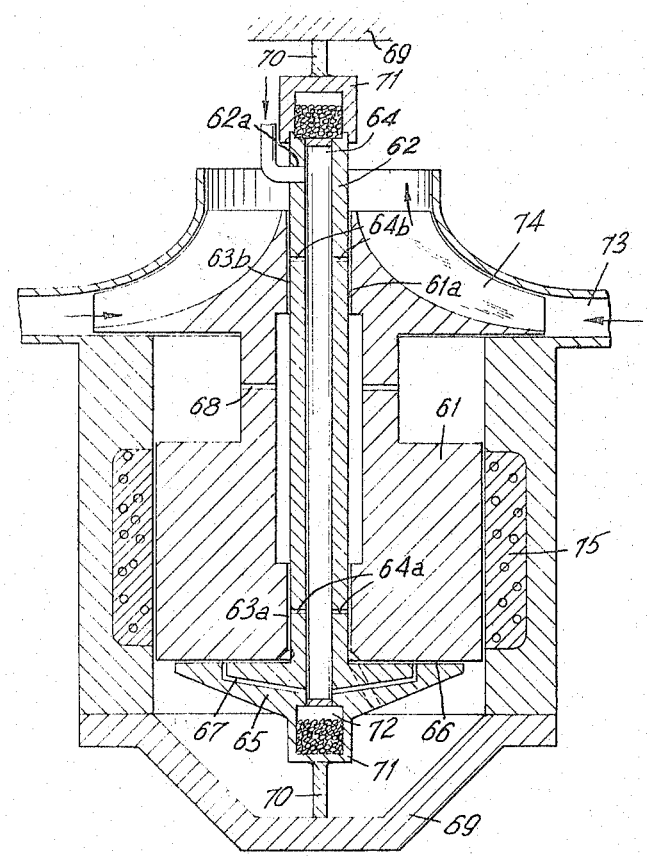
FIG. 6 illustrates a vertically instead of horizontally oriented gas-lubricated bearing assembly of this invention.

The gas lubricated bearing support assembly of this invention may also be oriented vertically as illustrated in FIG. 6 instead of horizontaly, as illustrated in FIGS. 1, 4 and 5. Referring now to FIG. 6, rotor 61 revolves about a vertical axis and is characterized by center passageway 61a concentric to this axis. Shaft 62 is centrally aligned in the passageway and boring 64 extends longitudinally therethrough. Lubricating gas is introduced through drilling 62a to boring 64 of shaft 62. Lubricating gas passageways 64a extend laterally through shaft 62 to provide communication between boring 64 and separate narrow annular space 63a.

In addition to lubricating gas passageway 64b communicating with longitudinal gas lubricating space 63b, one end of shaft 62 is provided with a thrust bearing 65. The latter at least partially surrounds one end of rotor 61 with a narrow annular space 66 therebetween, communicating with and normal to space 63a. Passageways 67 are drilled through thrust bearing section 65 to provide communication between central boring 64 and narrow annular space 66. In operation, lubricating-supporting gas is supplied at super-ambient pressure to central boring 64 of shaft 62 and transmitted through drilled passageways 64a, 64b and 67 to the annular narrow spaces 63a, 63b and 66, respectively, escaping through central radial passageways 68. The thrust load from rotor 61 is received by support section 65 through the gas film in annular space 66.

Shaft 62 as the primary support member is positioned from rigid secondary support members 69 by elastic support reduced diameter shaft 70 and damping assembly 71, the latter having one end aligned against the primary support shaft end in cavity 72 of thrust bearing 65. Elastic support shaft 70 joins the other end of damping assembly 71 and rigid secondary support member 69. Assembly 71 may constitute a cavity partially filled with metal particles.

In FIG. 6, energy is supplied to rotor 61 through turbine nozzle 73 as high pressure gas which contacts turbine wheel portion 74 and is discharged through an exhaust casing. At least part of the rotational energy is transferred from rotor 61 to generator 75 as the energy receiving means. Accordingly, FIG. 6 depicts a gas turbine-driven electric generator unit.

Although the aforedescribed tests were performed with externally pressurized or hydrostatic type gas bearings, the same principles are applicable to the self-acting or hydrodynamic type bearings, either of the shaft and bushing type or of the shaft and thrust pads type. In hydrodynamic type gas bearing systems., the gas film is provided from the surrounding atmosphere instead of from a source of superambient pressure. As is well understood in the art, hydrodynamic systems are started under friction conditions, for example, using anti-friction surfaces. Successful operation of the FIG. 1 apparatus as a self-acting bearing was realized when, after the required operating speed was reached, the lubricating gas supply was shut off and the rotating member continued to float on a hydrodynamic gas film while the primary support member was suspended elastically.

Although preferred embodiments have been described in detail, it will be recognized that obvious modifications and variations may be practiced without departing from the spirit and scope of the invention. For example, the primary support members need not be a shaft of uniform circular cross-section, but alternatively could have a central portion of enlarge diameter or even a spherical or conical shaped core.

What is claimed is:
1. A gas bearing assembly comprising:
 (a) a rotor having a passage therethrough substantially concentrically aligned with the axis of rotation;
 (b) means for imparting speed of at least 2000 r.p.m. to said rotor;
 (c) a rigid primary support member for said rotor extending longitudinally through said passage and sized to provide a narrow annular space between the outer surface of said primary support member and the passage wall;
 (d) means for introducing sufficient gas into said annular space to support and radially position said rotor;
 (e) elastic support means for said primary support member;
 (f) a rigid secondary support member for said flexible elastic support means; and
 (g) means for receiving at least part of the energy of rotation from said rotor.

2. A gas bearing assembly comprising:
 (a) a rotor having a passage therethrough substantially concentrically aligned with the axis of rotation;
 (b) means for imparting speed of at least 2000 r.p.m. to said rotor;
 (c) a rigid primary support member for said rotor extending longitudinally through said passage and sized to provide a narrow annular space between the outer surface of said primary support member and the passage wall;
 (d) means for introducing sufficient gas into said annular space to support and radially position said rotor;
 (e) elastic support means for said primary support member;
 (f) damping means for said primary support member being separate from said elastic support means;
 (g) a rigid secondary support member for flexible elastic support and damping means; and
 (h) means for receiving at least part of the energy of rotation from said rotor.

3. A gas bearing support assembly according to claim 1 in which a shaft comprises said primary support member.

4. A gas bearing assembly according to claim 1 in which a shaft comprises said primary support member, and a passageway extending at least partly through said shaft and communicating with said annular space comprises said means for introducing gas into such space.

5. A gas bearing assembly according to claim 2 in which a stationary shaft comprises said primary support member, said damping means is positioned in longitudinal alignment with said shaft and has one end contiguously associated with an end of the shaft, said flexible elastic support means is positioned in longitudinal alignment with said shaft and has one end contiguously associated with the other end of said damping means, the other end of said elastic support means being contiguously associated with said rigid secondary support member.

6. A gas bearing assembly according to claim 1 in which a stationary shaft comprises said primary support member, a thrust bearing section is provided at one end of said shaft as an integral part thereof, and is positioned so as to at least partially surround an end of said rotor with a narrow annular space therebetween, and means are provided for introducing sufficient gas into said annular space between the rotor end and said thrust bearing section to establish a gas film transmitting the thrust load from said rotor to said thrust bearing section.

7. A gas bearing assembly comprising:
(a) a rotor having a passage therethrough concentrically aligned with the axis of rotation;
(b) a rigid shaft support member for said rotor extending longitudinally through said passage and sized to provide a first narrow annular space between the outer surface of said shaft and the passage wall;
(c) a thrust bearing section at one end of said shaft as integral part thereof, being positioned so as to at least partially enclose an end of said rotor with a second narrow annular space therebetween;
(d) a longitudinal boring extending at least partly through said shaft and transverse passageways across said shaft providing gas communication between said boring and said first and second narrow annular spaces for introducing sufficient superambient gas into said spaces to both axially adjust and stabilize said rotor and transmit the thrust load from the rotor to said thrust bearing section;
(e) damping means contiguously associated with said one end of the shaft;
(f) elastic support means for said shaft continuously associated with said damping means and separated thereby from the shaft; and
(g) a rigid secondary support member contiguously associated with the elastic support means.

8. A gas bearing assembly according to claim 2 in which a longitudinal section of reduced cross-section forming an end of said primary support member comprises said elastic support means.

9. A gas bearing assembly according to claim 2 in which metal shots comprise said damping means.

10. A gas bearing assembly according to claim 2 in which a longitudinal section of reduced cross-section forming an end of said primary support member comprises said elastic support means, and metal shots comprise said damping means.

11. A gas bearing assembly according to claim 1 in which said gas introduced into said annular space is at superambient pressure.

12. A gas bearing assembly according to claim 2 in which said gas introduced into said annular space is at superambient pressure.

13. A gas bearing assembly according to claim 1 in which an electric motor comprises said means for imparting speed of at least 2000 r.p.m. to said rotor.

14. A gas bearing assembly according to claim 1 in which a gas turbine comprises said means for imparting speed of at least 2000 r.p.m. to said rotor.

15. A gas bearing assembly according to claim 1 in which an electric generator comprises said means for receiving at least part of the energy of rotation from said rotor.

16. A gas bearing assembly according to claim 1 in which a gas compressor comprises said means for receiving at least part of the energy of rotation from said rotor.

References Cited by the Examiner
UNITED STATES PATENTS

| | | | |
|---|---|---|---|
| 2,940,658 | 6/1960 | Birmann | 230—116 |
| 3,160,357 | 12/1964 | Jackson | 308—9 |

References Cited by the Applicant
UNITED STATES PATENTS

| | | |
|---|---|---|
| 2,760,356 | 8/1956 | Sixsmith. |
| 3,022,935 | 2/1962 | Frost. |

FOREIGN PATENTS

| | | |
|---|---|---|
| 796,926 | 6/1958 | Great Britain. |

DAVID J. WILLIAMOWSKY, *Primary Examiner.*
FRANK SUSKO, *Examiner.*